United States Patent
Simard

(10) Patent No.: US 7,263,227 B2
(45) Date of Patent: Aug. 28, 2007

(54) ACTIVITY DETECTOR

(75) Inventor: Patrice Y. Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 10/133,842

(22) Filed: Apr. 25, 2002

(65) Prior Publication Data

US 2003/0202696 A1    Oct. 30, 2003

(51) Int. Cl.
*G06K 9/46*    (2006.01)
(52) U.S. Cl. ....................... 382/195; 382/204
(58) Field of Classification Search .................. None
See application file for complete search history.

(56) References Cited

U.S. PATENT DOCUMENTS

| | | | |
|---|---|---|---|
| 3,606,546 A | | 9/1971 | Dudley et al. |
| 3,719,922 A | | 3/1973 | Lopes, Jr. et al. |
| 3,882,454 A | * | 5/1975 | Marie et al. .................. 382/199 |
| 4,606,069 A | | 8/1986 | Johnson et al. |
| 4,747,156 A | * | 5/1988 | Wahl ........................... 382/275 |
| 4,754,492 A | | 6/1988 | Malvar |
| 4,922,545 A | | 5/1990 | Endoh et al. |
| 4,924,494 A | | 5/1990 | Shung |
| 5,077,807 A | | 12/1991 | Bokser |
| 5,129,014 A | * | 7/1992 | Bloomberg ................... 382/287 |
| 5,304,991 A | | 4/1994 | Motegi |
| 5,402,146 A | | 3/1995 | Rodriguez et al. |
| 5,434,953 A | * | 7/1995 | Bloomberg ................... 345/670 |
| 5,454,047 A | * | 9/1995 | Chang et al. ................. 382/280 |
| 5,572,565 A | * | 11/1996 | Abdel-Mottaleb ............ 378/37 |
| 5,572,604 A | | 11/1996 | Simard |
| 5,610,996 A | | 3/1997 | Eller |
| 5,737,455 A | | 4/1998 | Harrington et al. |
| 5,754,183 A | | 5/1998 | Berend et al. |
| 5,778,092 A | | 7/1998 | MacLeod et al. |

(Continued)

FOREIGN PATENT DOCUMENTS

EP    0 567 344 A2    10/1993

(Continued)

OTHER PUBLICATIONS

Debargha Mukherjee, et al.; "JPEG2000-Matched MRC Compression of Compound Documents"; Jun. 6, 2002.

(Continued)

*Primary Examiner*—Joseph Mancuso
*Assistant Examiner*—Alex Liew
(74) *Attorney, Agent, or Firm*—Amin, Turocy & Calvin, LLP

(57) ABSTRACT

A system and method facilitating activity (e.g., dithering/half toning and/or noise) detection is provided. The invention includes an activity detection system having a connected component analyzer and an activity detector. The invention provides for the quantity of connected component(s) in and/or intersecting a region surrounding a pixel to be determined. The activity detector provides an activity map output based, at least in part, upon the quantity of connected component(s) in and/or intersecting the region. The invention further provides for an optional image processor. In one example, if the quantity exceeds a first threshold, dithering/half toning is detected and appropriate action can be taken. Additionally, if the quantity is less than a second threshold, noise is detected and appropriate action can be taken.

34 Claims, 12 Drawing Sheets

U.S. PATENT DOCUMENTS

| | | |
|---|---|---|
| 5,790,696 A | 8/1998 | Takahashi |
| 5,805,727 A | 9/1998 | Nakano |
| 5,805,739 A | 9/1998 | Malvar et al. |
| 5,828,771 A * | 10/1998 | Bloomberg ................ 382/112 |
| 5,910,805 A | 6/1999 | Hickey et al. |
| 5,914,748 A | 6/1999 | Parulski et al. |
| 5,915,044 A | 6/1999 | Gardos et al. |
| 5,917,951 A | 6/1999 | Thompson et al. |
| 5,917,964 A | 6/1999 | Normile |
| 5,923,380 A | 7/1999 | Yang et al. |
| 5,930,377 A | 7/1999 | Powell et al. |
| 5,960,111 A | 9/1999 | Chen et al. |
| 5,960,119 A | 9/1999 | Echigo et al. |
| 5,991,515 A | 11/1999 | Fall et al. |
| 6,000,124 A | 12/1999 | Saito et al. |
| 6,029,126 A | 2/2000 | Malvar |
| 6,058,362 A | 5/2000 | Malvar |
| 6,064,762 A | 5/2000 | Haenel |
| 6,069,636 A | 5/2000 | Sayuda et al. |
| 6,072,496 A | 6/2000 | Guenter et al. |
| 6,073,153 A | 6/2000 | Malvar |
| 6,094,506 A | 7/2000 | Hullender |
| 6,100,825 A | 8/2000 | Sedluk et al. |
| 6,108,446 A | 8/2000 | Hoshen |
| 6,115,689 A | 9/2000 | Malvar |
| 6,118,890 A | 9/2000 | Senior |
| 6,137,908 A | 10/2000 | Rhee |
| 6,144,767 A | 11/2000 | Bottou et al. |
| 6,151,424 A | 11/2000 | Hsu |
| 6,154,762 A | 11/2000 | Malvar |
| 6,182,034 B1 | 1/2001 | Malvar |
| 6,192,360 B1 | 2/2001 | Dumais et al. |
| 6,233,364 B1 * | 5/2001 | Krainiouk et al. .......... 382/275 |
| 6,240,380 B1 | 5/2001 | Malvar |
| 6,253,165 B1 | 6/2001 | Malvar |
| 6,256,608 B1 | 7/2001 | Malvar |
| 6,272,253 B1 | 8/2001 | Bannon et al. |
| 6,285,801 B1 | 9/2001 | Mancuso et al. |
| 6,309,424 B1 | 10/2001 | Fallon |
| 6,310,972 B1 | 10/2001 | Li et al. |
| 6,321,243 B1 | 11/2001 | Ballard |
| 6,324,560 B1 | 11/2001 | Malvar |
| 6,326,977 B1 | 12/2001 | Westerman |
| 6,334,001 B2 | 12/2001 | de Queiroz et al. |
| 6,345,119 B1 | 2/2002 | Hotta et al. |
| 6,564,263 B1 | 5/2003 | Bergman et al. |
| 6,633,670 B1 | 10/2003 | Matthews |
| 6,731,800 B1 | 5/2004 | Barthel et al. |
| 6,738,079 B1 | 5/2004 | Kellerman et al. |
| 6,819,796 B2 | 11/2004 | Hong et al. |
| 6,826,727 B1 | 11/2004 | Mohr et al. |
| 6,901,153 B1 | 5/2005 | Leone |
| 6,907,141 B1 | 6/2005 | Okamoto |
| 6,977,664 B1 | 12/2005 | Jinzenji et al. |
| 2001/0004618 A1 | 6/2001 | Hur |
| 2002/0064313 A1 | 5/2002 | Cheng |
| 2003/0123729 A1 | 7/2003 | Mukherjee et al. |
| 2003/0229856 A1 | 12/2003 | Lynn et al. |

FOREIGN PATENT DOCUMENTS

| | | |
|---|---|---|
| EP | 0 621 554 A2 | 10/1994 |
| EP | 0802680 | 10/1997 |
| EP | 0853421 | 7/1998 |
| EP | 1006714 A2 | 6/2000 |
| EP | 1104916 | 6/2001 |
| EP | 1006714 A3 | 9/2001 |
| EP | 1146478 A2 | 10/2001 |
| GB | 2181875 | 4/1987 |
| GB | 2 230 633 A | 10/1990 |

OTHER PUBLICATIONS

Rangachar Kasturi, et al.; "Document Image Analysis: A Primer"; Sadhana vol. 27, Part 1, Feb. 2002, pp. 3-22.

Qian Huang et al.; "Foreground/Background Segmentation of Color Images by Integration of Multiple Cues"; Proceedings of '95 Int'l. Conf. on Image Processing (ICIP.

Guotong Feng, et al.; "High Quality MRC Document Coding"; School of Electrical and Computer Engineering; Purdue University; Sarnoff Corporation.

Ping Wah Wong; Halftoning by Multiscale Dot Distribution; Proceedings of the '95 Int'l. Conf. on Image Processing (ICIP 3 95); pp. 117-120.

Yann LeCun, et al.; "Learning Algorithms for Classification: A Comparison on Handwritten Digit Recognition"; AT&T Bell Laboratories.

Patrice Y. Smiard, et al.; "Boxlets: A Fast Convolution Algorithm for Signal Processing and Neural Networks"; AT&T Labs-Research.

Trevor Hastie, et al.; "Metrics and Models for Handwritten Character Recognition"; Dec. 8, 1997; pp. 1-18.

Leon Bottou, et al.; "High Quality Document Image Compression with DjVu"; Jul. 13, 1998; AT&T Labs.

Patrick Haffner, et al.; "Color Documents on the Web with DjVu"; AT&T Labs—Research.

Yiu-fai Wong, et al.; Preprocessing of Video Signals for MPEG Coding by Clustering Filter; Proceedings of the '95 Int'l. Conf. on Image Processing (ICIP '95); pp. 129-132.

Patrick Haffner, et al.; "DjVu: Analyzing and Compressing Scanned Documents for Internet Distribution"; AT&T Labs-Research; pp. 1-4.

Felix Balado Pumarino, et al.; "A Two-Stage Codebook Building Method Using Fast WAN"; University of Vigo, Communications Technology Department.

Henrique S. Malvar; "Fast Progressive Wavelet Coding"; Microsoft Research.

Patrice Y. Simard, et al.; "A Wavelet Coder for Masked Images"; Proceedings of the Data Compression Conference (DCC'01); Microsoft Research.

U.S. Appl. No. 11/286,622, filed Apr. 25, 2002, Malvar et al.
U.S. Appl. No. 10/180,800, filed Jun. 26, 2002, Malvar et al.
U.S. Appl. No. 10/133,558, filed Apr. 25, 2002, Simard et al.
U.S. Appl. No. 10/133,939, filed Apr. 25, 2002, Simard et al.
U.S. Appl. No. 10/180,649, filed Jun. 26, 2002, Simard et al.
U.S. Appl. No. 10/180,169, filed Jun. 26, 2002, Simard et al.
U.S. Appl. No. 10/180,771, filed Jun. 26, 2002, Simard et al.
U.S. Appl. No. 11/198,562, filed Aug. 5, 2005, Simard et al.

Queiroz, et al. "Optimizing Block-Thresholding Segmentation for Multilayer Compression of Compound Images" (Sep. 9, 2000) IEEE Transactions on Image Processing, IEEE Inc. New York, pp. 1461-1471.

Salembier, et al. "Region-Based Representations of Image and Video: Segmentation Tools for Multimedia Services" (Dec. 8, 1999) IEEE Transactions on Circuits and Systems for Video Technology, IEEE Inc. New York, pp. 1147-1169.

Haffner, et al. "Browsing through high quality document images with DjVu" Research and Technology Advances in Digital Libraries. ADL 1998 Proceedings (Apr. 22, 1998) IEEE International Forum in Santa Barabra, California, pp. 309-318.

Simard, et al. "A Wavelet Coder for Masked Images" Proceedings IEE Data Compression Conference (Mar. 27, 2001) Snowbird, Utah, pp. 93-102.

European Search Report dated Oct. 4, 2005 mailed Oct. 13, 2005 for EPApplication Serial No. 03005430, 5 pages.

Mukherjee, et al. "LPEG-Matched MRC Compression of Compound Documents" Proceedings 2001 International Conference of Image Processing (Oct. 7-10, 2001) Thessalonki, Greece, pp. 434-437.

Cosman, et al. "Memory Efficient Quadtree Wavelet Coding for Compound Images" Conference Record of the Thirty-Third Asilomar Conference (Oct. 24-27, 1999) Piscataway, New Jersey, pp. 1173-1177.

European Search Report dated Sep. 15, 2005, mailed Sep. 30, 2005, for European Patent Application Serial No. 03 00 5429, 4 pages.

Witten, Ian H., et al; "Textual Image Compression", Data Compression Conference, IEEE, 10 pages, Mar. 24, 1992.

European Search Report dated Nov. 21, 2005, mailed Nov. 30, 2005, for European Patent Application Serial No. EP 03 00 6769, 3 Pages.

European Search Report dated Oct. 4, 2005 mailed Oct. 13, 2005 for EP Application Serial No. 03/005,431, 5 pages.

Simard, et al. "A Forefround/Background Separation Algorith for Image Compression" (Mar. 23, 2004) Data Compression Conference, Snowbird, Utah, pp. 498-507.

Queiroz, et al. "Optimizing Block-Threseholding Segmentation for Multilayer Compression of Compound Images" (Sep. 9, 2000) IEEE Transactions on Image Processing, IEEE Inc. New York, pp. 1461-1471.

Salembier, et al. "Region-Based Representations of Image and Video: Segmentation Tools for Multimedia Services" (Dec. 8, 1999) IEEE Transactions on Circuits and Systems for Video Technology, IEEE Inc. New York, pp. 1147-1169.

Haffner, et al, "Browsing through high quality document images with DjVu" Research and Technology Advances in Digital Libraries. ADL 1998 Proceedings (Apr. 22, 1998) IEEE International Forum in Santa Barabra, California, pp. 309-318.

Simard, et al. "A Wavelet Coder for Masked Images" Proceedings IEE Data Compression Conference (Mar. 27, 2001) Snowbird, Utah, pp. 93-102.

Simard, et al. "Forefround/Background Separation Algorith for Image Compression" (Mar. 23, 2004) Data Compression Conference, Snowbird, Utah, pp. 498-507.

European Search Report dated Oct. 4, 2005 mailed Oct. 13, 2005 for PCT Application Serial No. 03/005,430, 5 pages.

Mukherjee, et al. "LPEG-Matched MRC Compression of Compound Documents" Proceedings 2001 International Conference of Image Processing (Oct. 7-10, 2001) Thessalonki, Greece, pp. 434-437.

Cosman, et al. "Memory Efficient Quadtree Wavelet Coding for Compound Images" Conference Record of the Thirty-Third Asilomar Conference (Oct. 24-27, 1999) Piscataway, New Jersey, pp. 1173-1177.

European Search Report dated Oct. 4, 2005 mailed Oct. 13, 2005 for PCT Application Serial No. 03/005,431, 5 pages.

* cited by examiner

ACTIVITY DETECTOR

TECHNICAL FIELD

The present invention relates generally to document image processing, and more particularly to a system and method facilitating activity (e.g., dithering/half toning, texture(s) and/or noise) detection.

BACKGROUND OF THE INVENTION

Conventionally, document output devices (e.g., computer printers and traditional print devices, for example, newspaper printing presses) have had limited ability to print grayscale image(s) and/or color image(s). To compensate, techniques, such as dithering and half toning, have been developed to allow a viewer to perceive grayscale and/or color(s) that are not native to the output device. For example, with regard to a color output device, by placing one or more red pixels in proximity to one or more blue pixels, a level of violet can be observed by a viewer. Similarly, with regard to a single color output device (e.g., computer printer equipped with black ink) by placing one or more blank (e.g., white) pixels in proximity to one or more black pixels, a level of gray can be observed by a viewer.

While achieving a more aesthetically pleasing document, these compensation techniques can present difficulty for conventional data compression systems. Noise (e.g., extraneous information such as mark(s)) can likewise reduce data compression by creating a high energy variance on an otherwise generally smooth image. Data compression reduces the space necessary to represent information. Compression can be used for any type of information. However, compression of digital information, including images, text, audio, and video is becoming more important. Typically, data compression is used with standard computer systems. However, other technologies make use of data compression, such as, but not limited to, digital and satellite television as well as cellular/digital phones.

For example, the dithering and/or half toning can be mistaken for text by a character recognition system. Further, dithering and/or half toning can lead to a document having adjacent pixels of significantly different energies (e.g., blue pixel adjacent to a red pixel) that can be difficult for a conventional document compression system to compress effectively.

Effective data compression is important for several reasons. Data compression allows information to be stored in less space than uncompressed data. As the demand for large amounts of information increases, data compression may be required to supply these large amounts of information. The size of storage devices has increased significantly; however, the demand for information has outstripped these size increases. For example, an uncompressed image can take up 5 megabytes of space whereas the same image can be compressed and take up only 2.5 megabytes of space. Additionally, data compression permits transferring of larger amounts of compressed information than uncompressed information. Even with the increase of transmission rates, such as broadband, DSL, cable modem Internet and the like, transmission limits are easily reached with uncompressed information. For example, transmission of an uncompressed image over a DSL line can take ten minutes. However, with data compression, the same image can be transmitted in about a minute.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with an aspect of the present invention, an activity detection system receives a bi-level image input (e.g., a binary mask received from a mask separator component or a scanned image from a document scanner and/or a facsimile machine). The activity detection system analyzes the bi-level image and provides an activity output based, at least in part, upon the quantity of connected components in or intersecting a region.

For example, the activity detection system can analyze the bi-level image for dithering/half toning and/or noise. The activity detection system provides an activity map output based on the bi-level image input. Optionally, the activity detection system can provide a processed image with reduced dithering/half toning and/or noise.

The activity detection system includes a connected component analyzer and an activity detector. Optionally, the activity detection system can include an image processor. The connected component analyzer is adapted to determine a quantity of connected component(s) in and/or intersecting a region surrounding a pixel. Bi-level image(s) based on document image(s) having dithering/half toning typically have a significant quantity of connected component(s) in and/or intersecting the region. Thus, by determining the quantity of connected component(s) in and/or intersecting the region, the activity detection system can detect area(s) in which dithering/half toning and/or noise is likely to be present.

Additionally, the activity detector can be used for detecting region(s) likely to have text, which typically have more connected components than an otherwise homogeneous (e.g., white) background. The area of homogeneous (e.g., white) background may still have random specs (noise) which can be removed, but only once it is known that the specs do not belong to text.

Other applications in image processing which depends on determining the level of activity can benefit from the present invention.

The connected component analyzer can determine the quantity of connected component(s) in and/or intersecting a region generally surrounding a particular pixel utilizing a variety of technique(s). Once the quantity of connected components has been determined by the connected component analyzer, the activity detector can provide an activity map output based, at least in part, upon the quantity of connected components in or intersecting the region. For example, image processor can utilize the activity map output and the binary image. The image processor can assign a pixel as belonging to a high activity region or not, by comparing the activity to a first threshold (e.g., three).

Optionally, the activity detector can dilate or erode the regions where activity has been detected. Such operation is performed to smooth the activity region(s) which can have small holes as a result of the thresholding operation.

Generally, a region of a bi-level image having handwriting and/or printed text will have relatively few connected components, compared to dithered color in an illustration. To the contrary, a region of a bi-level image having dithering/half toning, possibly in addition to handwriting and/or printed text, will have a relatively large number of connected components. Thus, for purposes of detecting dithering/half toning, the quantity of connected component(s) in and/or intersecting a particular region generally surrounding a particular pixel can be compared to a first threshold (e.g., three). If the quantity of connected component(s) in and/or intersecting the particular region exceeds the first threshold, dithering/half toning is likely present and the pixel can be assigned the label of high activity.

Further, the dithering/half toning can be reversed by applying a low pass filter on the image, and by replacing the pixel in the regions of high activity by the pixels resulting from the low pass filter.

In addition to detecting dithering/half toning, the activity detection system can further be adapted to detect noise in the bi-level image input. Removal of noise in the bi-level image input can lead to improved data compression (e.g., resulting from a smoother image). A region of a bi-level image having a little bit of noise would typically exhibit relatively little activity in places were the image was originally white. For example, a region comprised solely of a connected stray mark on a white background would have one connected component. Region(s) comprising printed text would have a higher density of connected components.

In determining whether a mark should be removed, the quantity of connected component(s) in and/or intersecting a particular region generally surrounding a particular pixel can be compared to a second threshold (e.g., two). If the quantity of connected component(s) in and/or intersecting the particular region is less than the second threshold, the stray mark is likely a result of noise and the corresponding pixels can be assigned to the background color of the region, to provide, for example, improved data compression. If on the other hand, the quantity of connected component(s) in and/or intersecting the particular region is greater than the second threshold, it is more likely that the mark is indeed part of the text, and it should therefore not be removed.

Another aspect of the present invention provides for the activity detection system to further include a connected component calculator. The connected component calculator receives a bi-level image as an input. Using, for example, 4-connectivity or 8-connectivity method(s), connected components within the bi-level image are identified. Information associated with the connected components within the bi-level image is then provided to the connected component analyzer.

Yet another aspect of the present invention provides for a segmented layered image system (e.g., facilitating identification and/or compression of text, handwriting, drawings and the like) having an activity detection system, a connected component calculator and a mask separator component. The mask separator component receives a document image (e.g., based on a document to be archived and/or transmitted). The document image can be a binary, RGB and/or YUV representation of document(s). The mask separator component processes the document image and outputs a mask (e.g., binary) indicating whether each pixel of the document image belongs in the foreground and/or background. For example, a page of black text on a beige background could end up having a completely black foreground and a completely beige background, with the mask capturing the text as a binary image. The mask can then be processed by the connected component calculator and the activity detection system. The activity detection system analyzes the mask for dithering/half toning and/or noise. In the example above, the beige background could contain dithering, and result in a dithered mask, which would not compress very well. The activity detection system provides a bi-level output based on the mask input and can be used to pin-point the region(s) of dithering. The bi-level output can then be utilized by other components of the segmented layered image system, for example, to achieve effective compression of the mask, the foreground and/or the background.

Another aspect of the present invention provides the activity detection system to be employed in a vast array of document image applications, including, but not limited to, photocopiers, document scanners, optical character recognition systems, personal digital assistants, fax machines, digital cameras, tablet personal computers and/or digital video cameras.

Other aspects of the present invention provide a method for detecting dithering/half toning, a method for detecting noise and a computer readable medium having computer usable instructions for an activity detection system. Also provided is a data packet adapted to be transmitted between two or more computer processes comprising information associated with a bi-level image output, the bi-level image output being based at least in part upon a bi-level image input comprising a plurality of pixels, at least one of the pixels assigned to one of a background or a foreground based at least in part upon the quantity of connected component(s) in and/or intersecting a region. Further provided is a data packet adapted to be transmitted between two or more computer components that facilitates activity detection, the data packet comprising information associated with an activity output, the activity output based, at least in part, upon with a quantity of connected components in a region.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 7 is a double integral image of the derivative image of FIG. 6 in accordance with an aspect of the present invention.

FIG. 8 is a thresholded image of the double integral image of FIG. 7 in accordance with an aspect of the present invention.

DETAILED DESCRIPTION OF THE INVENTION

Figure 1:
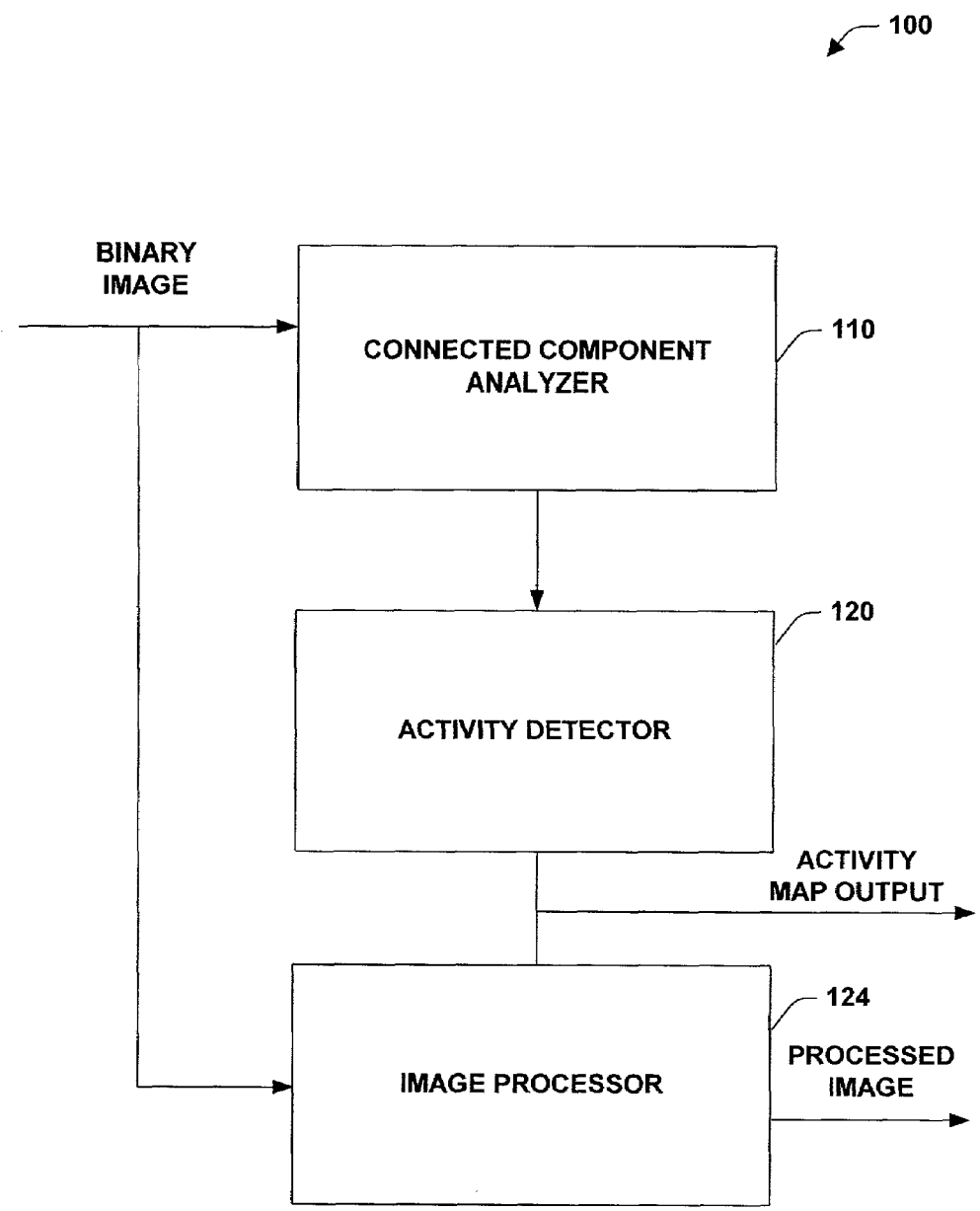
FIG. 1 is block diagram of an activity detection system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Further, "document image" is intended to refer to a digital representation of document(s) comprising one or more color(s) (e.g., binary (e.g., black/white), gray-scale and/or color document(s)). Additionally, a document image can have image(s), text and/or text with images. A document image can be binary, RGB and/or YUV representations of document(s). An RGB document image is represented red, green and blue components. A YUV document image is represented using a luminescence component denoted by Y and chrominance components denoted by U and V. Less bits can be used to represent the chrominance components U and V without significantly sacrificing visual quality of the YUV image. The YUV representation is, generally, a more compact and easy to use representation than an RGB representation. A document image comprises picture elements commonly referred to as "pixels". A document image can be based on single or multi-page document(s) of any shape or size.

A "connected component" refers to a grouping of two or more adjacent pixels that exhibit connectivity having generally similar values. Connectivity can be 4-connected or 8-connected. With regard to a 4-connected component, a pixel is only connected to an adjacent pixel via the four primary compass directions, while with regard to an 8-connected component, a pixel is connected to an adjacent pixel by the four primary compass directions and the four diagonal corners. Thus, with regard to 8-connected, a diagonal line of pixels comprise a connected component.

Referring to FIG. 1, an activity detection system 100 in accordance with an aspect of the present invention is illustrated. The activity detector system 100 includes a connected component analyzer 110 and an activity detector 120. Optionally, the activity detection system 100 can include an image processor 124.

The activity detection system 100 receives a bi-level image input. For example, the bi-level image input can be a binary mask received from a mask separator component (not shown) or a scanned image (e.g., from a document scanner and/or a facsimile machine). For example, the activity detection system 100 can analyze the bi-level image for dithering/half toning and/or noise. The activity detection system 100 provides an activity map output (e.g., binary) based on the bi-level image input based, at least in part, upon the quantity of connected components in or intersecting the region.

The connected component analyzer 110 is adapted to determine a quantity of connected components in and/or that intersect a region surrounding a pixel. Bi-level image(s) based on document image(s) having dithering/half toning typically have a significant quantity of connected component(s) in and/or intersecting the region. Additionally, bi-level image(s) having noise typically have few connected component(s) in and/or intersecting the region. Thus, in one example, by determining the quantity of connected component(s) in and/or intersecting the region, the activity detector system 100 can detect areas in which dithering/half toning and/or noise is likely present. In another example, other characteristics which depend on pixel activity, for example, textures, can be detected by counting the number of connected component intersecting a region surrounding each pixel.

Figure 2:
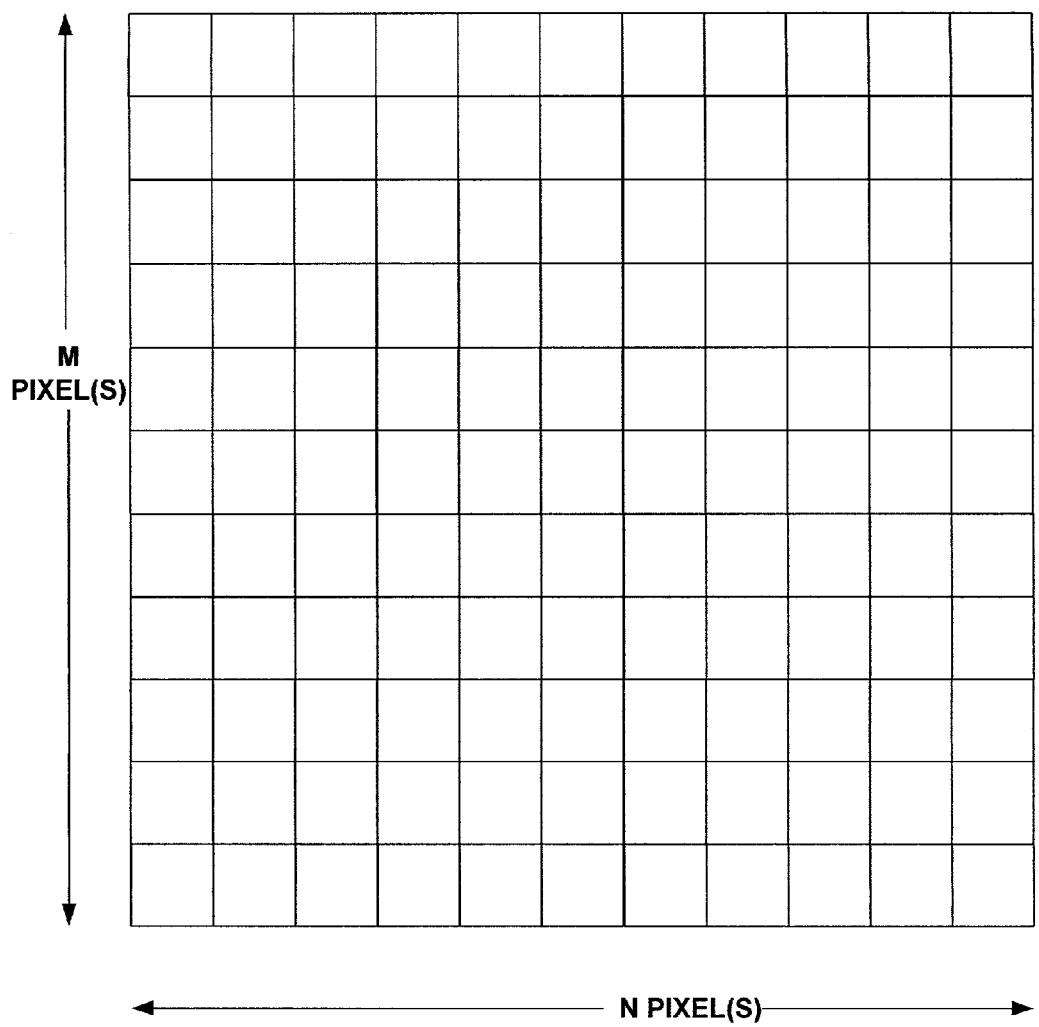
FIG. 2 is an exemplary region of pixels in accordance with an aspect of the present invention.

Turning briefly to FIG. 2, an exemplary region of pixels is illustrated. The region comprises N column(s) x M rows of pixels, N and M being integers greater than or equal to one. For example, N can be equal to M; N can be greater than M; or N can be less than M. The region can comprise some or all of the bi-level image.

Figure 3:
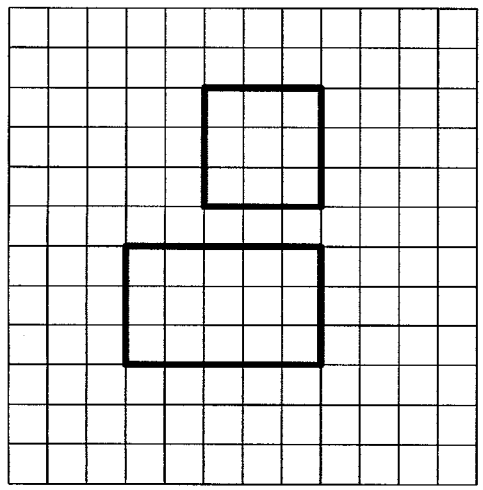
FIG. 3 is an exemplary binary image of connected components in accordance with an aspect of the present invention.
Figure 4:
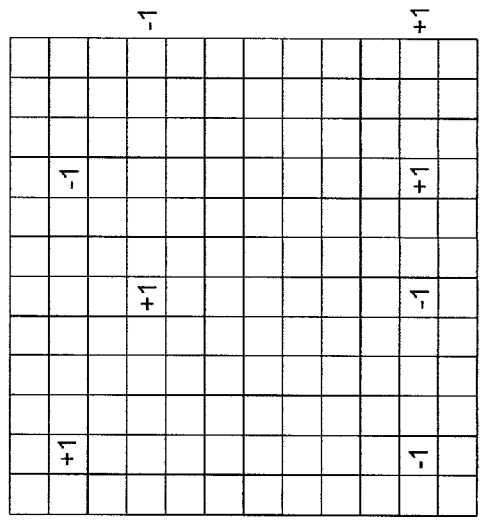
FIG. 4 illustrates bounding boxes of the connected components of FIG. 3 in accordance with an aspect of the present invention.

Referring back to FIG. 1, in one example, the connected component analyzer 110 determines the quantity of connected component(s) in and/or intersecting a region generally surrounding a particular pixel ("the center pixel"). More precisely, this can be explained as a 4 step process. Turning to FIG. 3, an exemplary binary image having two connected components in accordance with an aspect of the present invention is illustrated. As illustrated in FIG. 4, first the bounding box(es) of the connected component(s) are extracted. For example, the bounding box(es) can easily be computed at the same time as the connected component(s). While the bounding box(es) are illustrated as rectangles in this example, it is to be appreciated that other shapes roughly representing the connected component(s) can be employed in accordance with an aspect of the present invention. However, bounding box(es) having a rectangular shape present a computational efficiency advantage which will become clear shortly.

Figure 5:
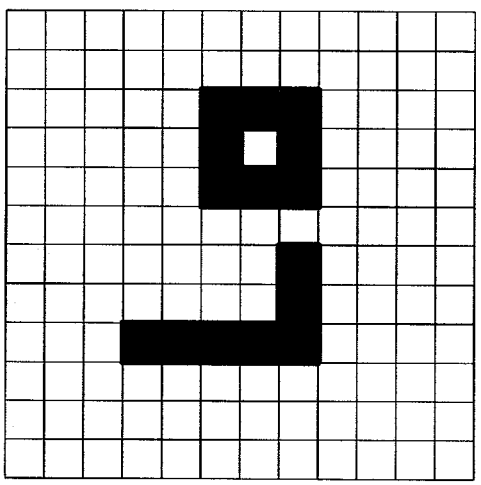
FIG. 5 illustrates extended bounding boxes of the connected components of FIG. 4 in accordance with an aspect of the present invention.

As illustrated in FIG. 5, in the next step, the bounding box regions are enlarged to influence a larger region. For instance, if we wanted to compute the number of connected component(s) that intersect a region of radius k pixel around a center pixel, we would enlarge each bounding box by about k pixels. For example, referring to FIG. 5, the bounding boxes have been enlarged by 2 pixels in all directions from the bounding boxes of FIG. 4.

Figure 6:
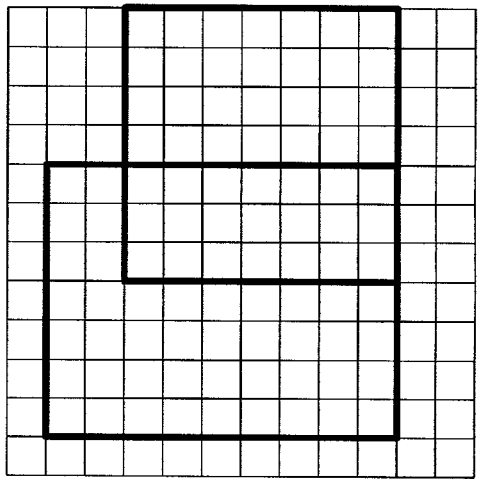
FIG. 6 is a derivative image of the extended bounding boxes of FIG. 5 in accordance with an aspect of the present invention.

Turning to FIG. 6, in the third step, we create a "derivative image", initially filled with zeros. This derivative image will store the derivative of substantially all the contribution(s) of the enlarged bounding boxes. The goal is to have each enlarged bounding boxes increase the count of the pixels of the activity image by 1. But if there are many overlapping bounding boxes, this operation can be prohibitively expensive. Thus, in one example, instead of adding 1 to a rectangular region determined by the bounding box, we add the derivative (e.g., both in X and Y) of such region. It is easy to show that this derivative correspond to +1 in the top-left and bottom-right corner, and −1 in the top-right and bottom-left corner. Adding this derivative can be done in constant time. FIG. 6 illustrates the result of adding the contribution of the enlarged bounding boxes of the connected components of FIG. 5. The empty squares in the picture represent zeros, which were the initial values before any contribution was registered.

Figures 7, 8:
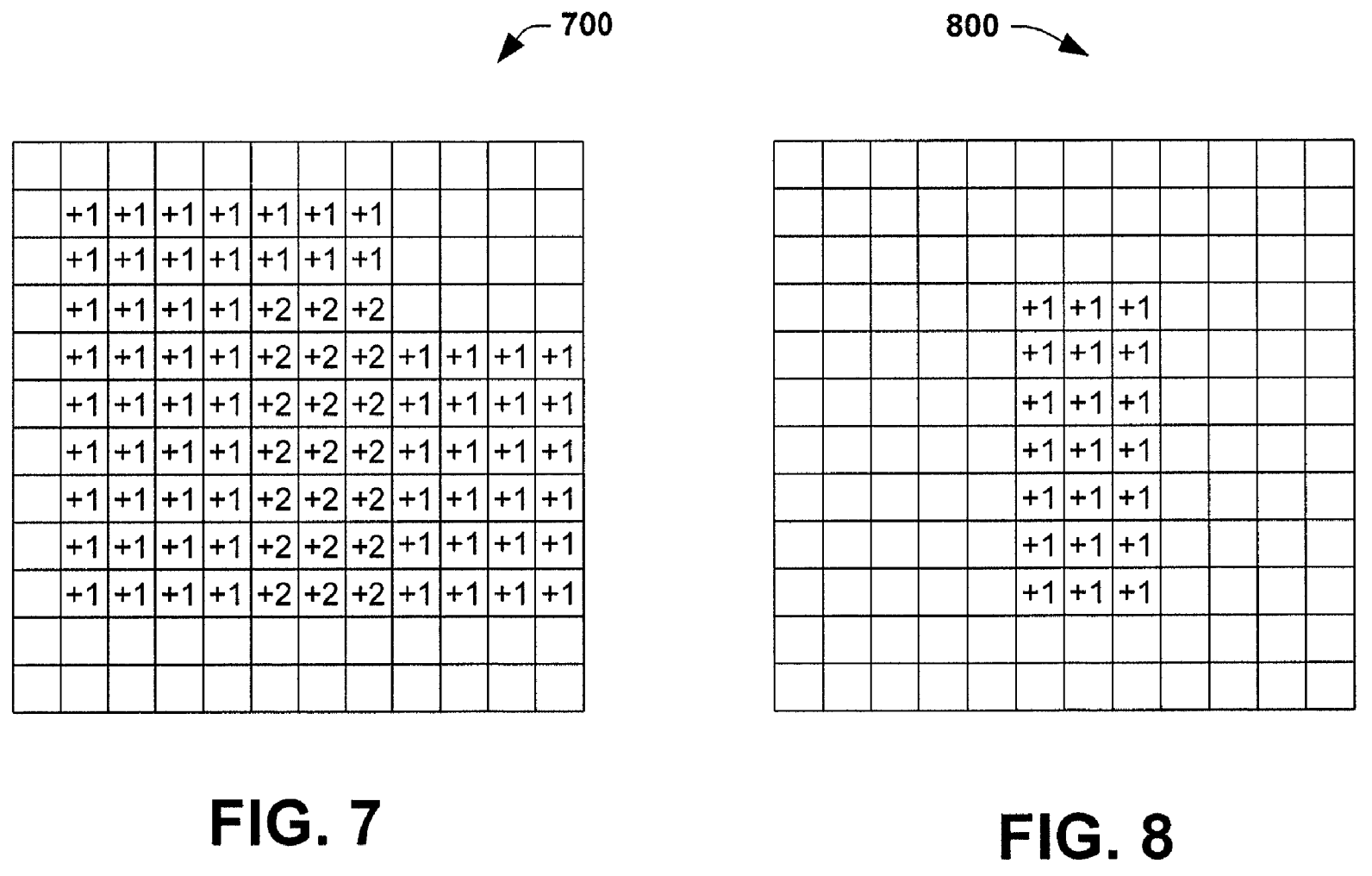

Referring to FIG. 7, the last step of counting the connected component intersecting each regions, consist of computing the double integral of the derivative image. The result of this operation is illustrated in FIG. 7. In one example, the double integral operation simply consist in computing:

$$\text{Integral}(I, J) = \sum_{k=0}^{k<I} \sum_{l=0}^{l<J} \text{Derivative}(k, l)$$

Pseudo code for computing the double integral over the whole image (e.g., in one sweep) follows:

TABLE 1

```
template <class T1, class T2>
double_integral(T1 *x, T2 *iix, size_t nrows, size_t ncols)
{
    T2 sum;
    size_t i,j;
    sum = 0;
    for(j=0;j<ncols;j++) {
        sum += x[j];
        iix[j] = sum;
    }
    T1 *px = x + ncols;
    T2 *piix = iix + ncols;
    for(i=1; i<nrows;i++) {
        sum = 0;
        for(j=0;j<ncols;j++) {
            sum += px[j];
            piix[j] = piix[-ncols+j] + sum;
        }
        px += ncols;
        piix += ncols;
    }
}
```

As can be seen from FIG. 7, each pixel location now contains a count of the number of bounding boxes that intersect a region of 5 by 5 (since the enlargement was of two pixel).

It should be noted that for increased speed, the derivative and integral can be computed at lower resolution than the initial image. For instance, the enlarged bounding boxes corners coordinates can be divided by 2 or 3 before updating the derivative image. In that case, the derivative image and the integral image are smaller by the same factor in both height and width.

Turning to FIG. 8, the last step consists in thresholding the count image. For instance, any pixel location where the count is higher than a third threshold can be considered as having high activity. It is often the case that such thresholded image will have some noise patterns (e.g., holes and/or dots). Further processing can be performed (dilation, erosion, smoothing), for example, to obtain a simple image of activity.

Referring back to FIG. 1, in another one example, the connected component analyzer 110 determines the quantity of connected component(s) in and/or intersecting a region generally surrounding a particular pixel ("the center pixel"). Initially, the relative quantity of each connected component in the region is initialized, for example, to zero. Thereafter, as each pixel of the region is reviewed, each instance in which a particular connected component is first encountered—the relative quantity of the connected component being incremented from zero—a counter associated with the center pixel is incremented. Additionally, the relative quantity of the connected component is incremented. Once substantially all of the pixels of the region have been reviewed, the counter associated with the center pixel contains the quantity or about the quantity of connected component(s) in and/or intersecting the region surrounding the center pixel. The quantity of connected components associated with the center pixel can be stored for use by the activity detector 120, for example, in an array, list and/or other suitable data store.

The region of focus can sequentially be shifted, for example, to the right, to the left, up or down, until substantially all of the pixels of the bi-level image have been reviewed. Once substantially the entire image has been reviewed, the quantity of connected components for a region surrounding each pixel can be stored for use by the activity detector 120.

In yet another example, the connected component analyzer 110 determines the quantity of connected component(s) in and/or intersecting a region generally surrounding a particular pixel ("the center pixel") by maintaining the identity of substantially all connected components along with the relative quantity of each connected component in the region. Initially, the relative quantity of each connected component in the region is initialized, for example, to zero. Thereafter, as each pixel of the region is reviewed, each instance in which a particular connected component is first encountered—the relative quantity of the connected component being incremented from zero—a counter associated with the center pixel is incremented. Additionally, the relative quantity of the connected component is incremented. Once substantially all of the pixels of the region have been reviewed, the counter associated with the center pixel contains about the quantity of connected component(s) in and/or intersecting the region surrounding the center pixel. The quantity of connected components associated with the center pixel can be stored for use by the activity detector 120, for example, in an array, list and/or other suitable data store.

The region of focus can be shifted, for example, to the right, to the left, up or down, by one pixel. As the region of focus is substantially similar to the previous region, differing in only one column or one row, the relative quantity for each of the connected components and the counter for the center pixel can be copied with respect to the new center pixel. The relative quantity for each of the connected components can be decreased based on review of pixels of the column or row from the previous region of focus not included in the current region of focus, each instance in which a particular connected component previously encountered, that is, the relative quantity of the connected component being decremented from one to zero—the counter associated with the center pixel can be incremented. Further, the relative quantity for each of the connected components can be increased based on review of pixels of the column or row added to the region of focus with each instance in which a particular connected component is first encountered—the relative quantity of the connected component being incremented from zero—causing the counter associated with the center pixel to be incremented. Once substantially all the pixels of the image have been reviewed, the quantity of connected component(s) for a region surrounding each pixel can be stored for use by the activity detector 120.

In yet a fourth example, the connected component analyzer 110 determines the quantity of connected component(s) in and/or intersecting a region by determining, for each connected component, the derivative with respect to x (horizontal) and y (vertical) of the connected component—thus identifying the boundary with respect to x and y of each connected component. A leading edge of the connected component can be identified by a positive one (+1) while a following edge of the connected component can be identified by a negative one (−1). Information regarding the derivative with respect to x and y of each connected component can be stored and then integrated with respect to x and y for use by the activity detector 120. The quantity of connected components determined in accordance with this example can be determined with significantly less computational overhead but can result in an approximation of the quantity of connected components.

The activity detector 120 is adapted to provide an activity map output based, at least in part, upon the quantity of connected components in a region. The image processor 124 receives the activity map output and the binary image input. The image processor 124 assigns a pixel to a foreground or a background based, at least in part, upon the activity map output.

In one example, the image processor 124 assigns a pixel to one of a background or a foreground based at least in part upon the quantity of connected component(s) in and/or intersecting the region surrounding the pixel. Typically, handwriting and/or printed text exhibit degrees of connectivity. For example, many words are handwritten without lifting of the writing instrument. Similarly, many individual characters, numbers and symbols are printed with substantially all pixels of the individual character or number being connected to another pixel of the character or number. Notable exceptions to this general rule are the lowercase "i" and "j".

Generally, a region of a bi-level image having handwriting and/or printed text will have relatively few connected components. To the contrary, a region of a bi-level image having dithering/half toning, possibly in addition to handwriting and/or printed text, will have a relatively large number of connected components. Thus, for purposes of detecting dithering/half toning, the quantity of connected component(s) in and/or intersecting a particular region generally surrounding a particular pixel can be compared to a first threshold (e.g., three). If the quantity of connected component(s) in and/or intersecting the particular region exceeds the first threshold, dithering/half toning is likely present and the pixel can be assigned to either the foreground or background of the document to provide, for example, improved data compression. If the quantity of connected component(s) in and/or intersecting the particular region exceeds the first threshold, dithering/half toning is likely present and the pixel can be assigned the label of high activity.

Further, the dithering/half toning can be reversed by applying a low pass filter on the image, and by replacing the pixel in the regions of high activity by the pixels resulting from the low pass filter.

Optionally, the activity detector 120 can dilate or erode the regions where activity has been detected. Such operation is performed to smooth the activity region(s) which can have small holes as a result of the thresholding operation.

In another example, the image processor 124 determines a quantity of pixels in the background of the region and a quantity of pixels in the foreground of the region. The image processor 124 then assigns the particular pixel to the foreground if the quantity of pixels in the foreground of the region is greater than the quantity of pixels in the background of the region, the image processor 124 otherwise assigning the particular pixel to the background.

In addition to detecting dithering as discussed above, the image processor 124 can further be adapted to detect noise in the bi-level image input. "Noise" refers to extraneous information (e.g., mark(s)) deletion of which will not substantially compromise integrity of the bi-level image. Removal of noise in the bi-level image input can lead to improved data compression resulting from a smoother image. A region of a bi-level image having noise would typically exhibit relatively little connectivity. For example, a region comprising solely a connected stray mark on a white background would have one connected component.

In determining whether noise is present, the quantity of connected component(s) in and/or intersecting a particular region generally surrounding a particular pixel can be compared to a second threshold (e.g., two). If the quantity of connected component(s) in and/or intersecting the particular region is less than the second threshold, noise is likely present and the pixel can be assigned to the color of the background of the document to provide, for example, improved data compression. In order to detect noise, the image processor 124 is adapted to assign a particular pixel to one of a background or a foreground based, at least in part, upon the quantity of connected component(s) in and/or intersecting the region surrounding the pixel. In one example, the image processor 124 assigns the pixel to the background if the quantity of connected components is less than a third threshold (e.g., two).

It is to be appreciated that the activity map output of the activity detection system 100 can be utilized for various other characteristics that depend on pixel activity. For example, textures can be detected by counting the number of connected component intersecting a region surrounding each pixel.

While FIG. 1 is a schematic diagram illustrating components for the activity detector system 100, it is to be appreciated that the activity detector system 100, the connected component analyzer 110, the activity detector 120 and/or the image processor 124 can be implemented as one or more computer components, as that term is defined herein. Thus, it is to be appreciated that computer executable components operable to implement the activity detector system 100, the connected component analyzer 110, the activity detector 120 and/or image processor 124 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 9:
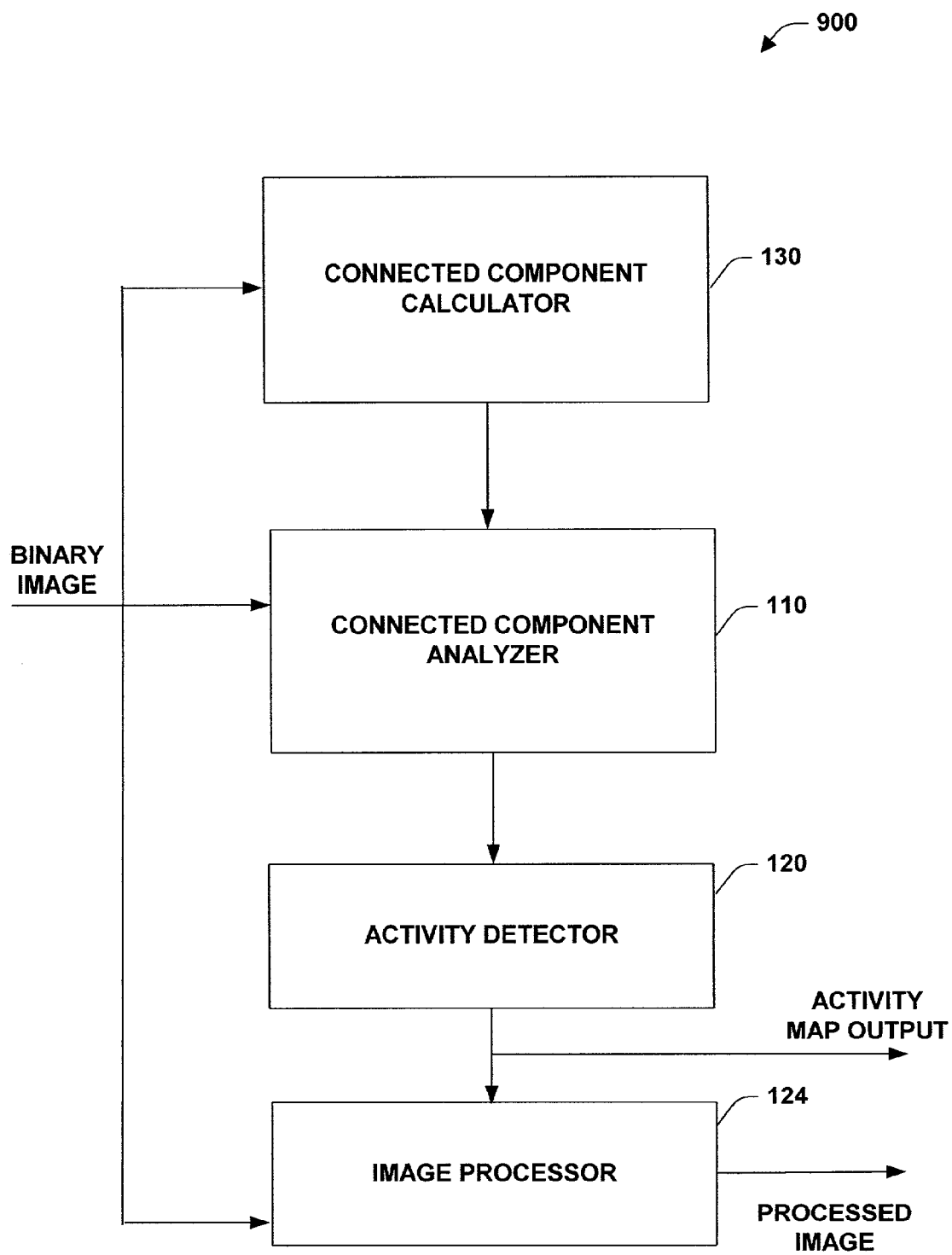
FIG. 9 is a block diagram of an activity detection system in accordance with an aspect of the present invention.

Referring next to FIG. 9, an activity detection system 900 in accordance with an aspect of the present invention is illustrated. The activity detection system 900 includes a connected component analyzer 110, a activity detector 120 and a connected component calculator 130. Optionally, the system 900 can include an image processor 124.

The connected component calculator 130 receives a bi-level image as an input. Using, for example, 4-connectivity or 8-connectivity method(s), connected component(s) within the bi-level image are identified. Information associated with the connected component(s) within the bi-level image is then provided to the connected component analyzer 110 for use as previously described. It is to be appreciated that the connected component calculator 130 can be a computer component as that term is defined herein.

Figure 10:
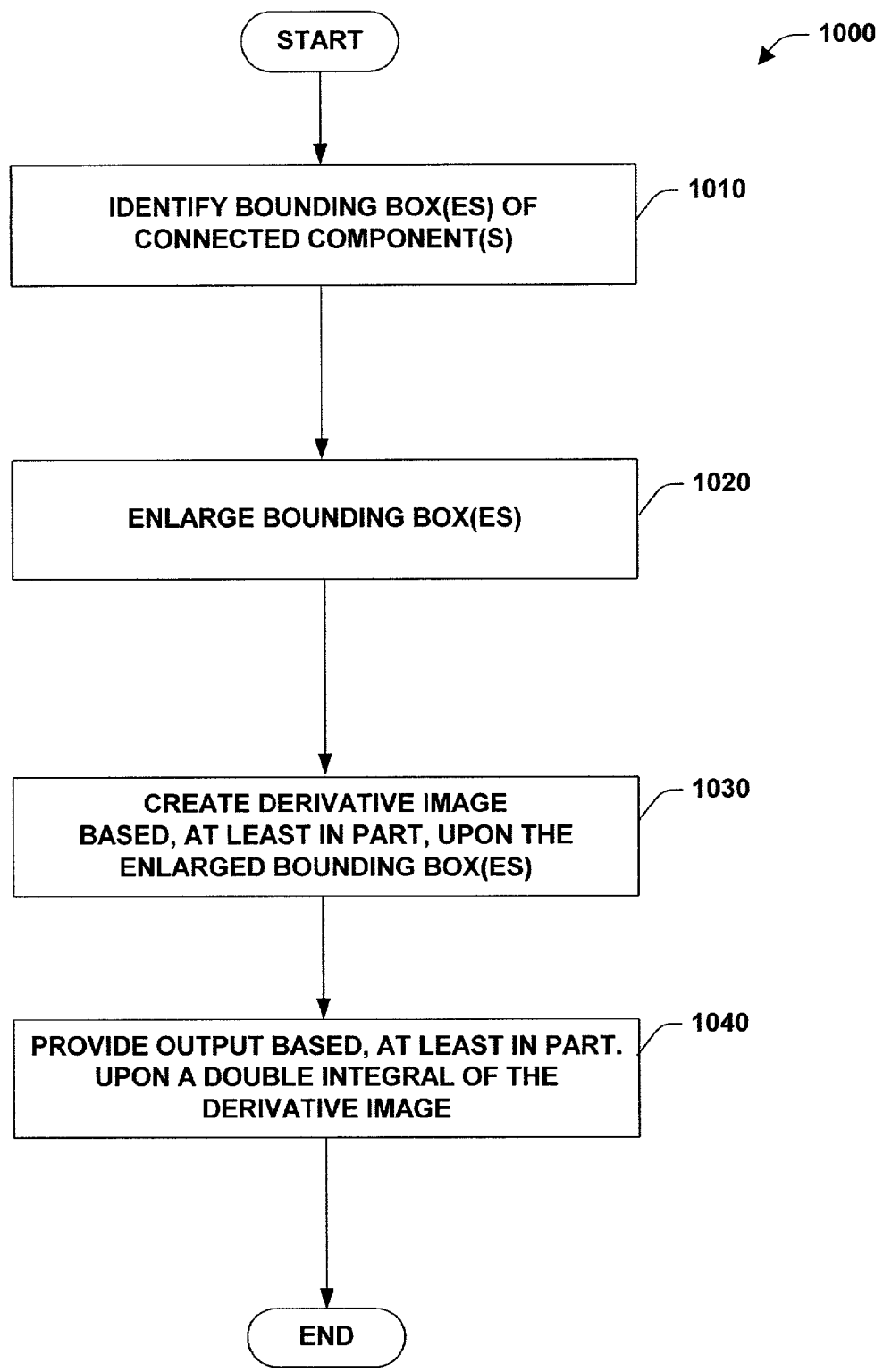
FIG. 10 is a flow chart illustrating a methodology for detecting activity in accordance with an aspect of the present invention.
Figure 11:
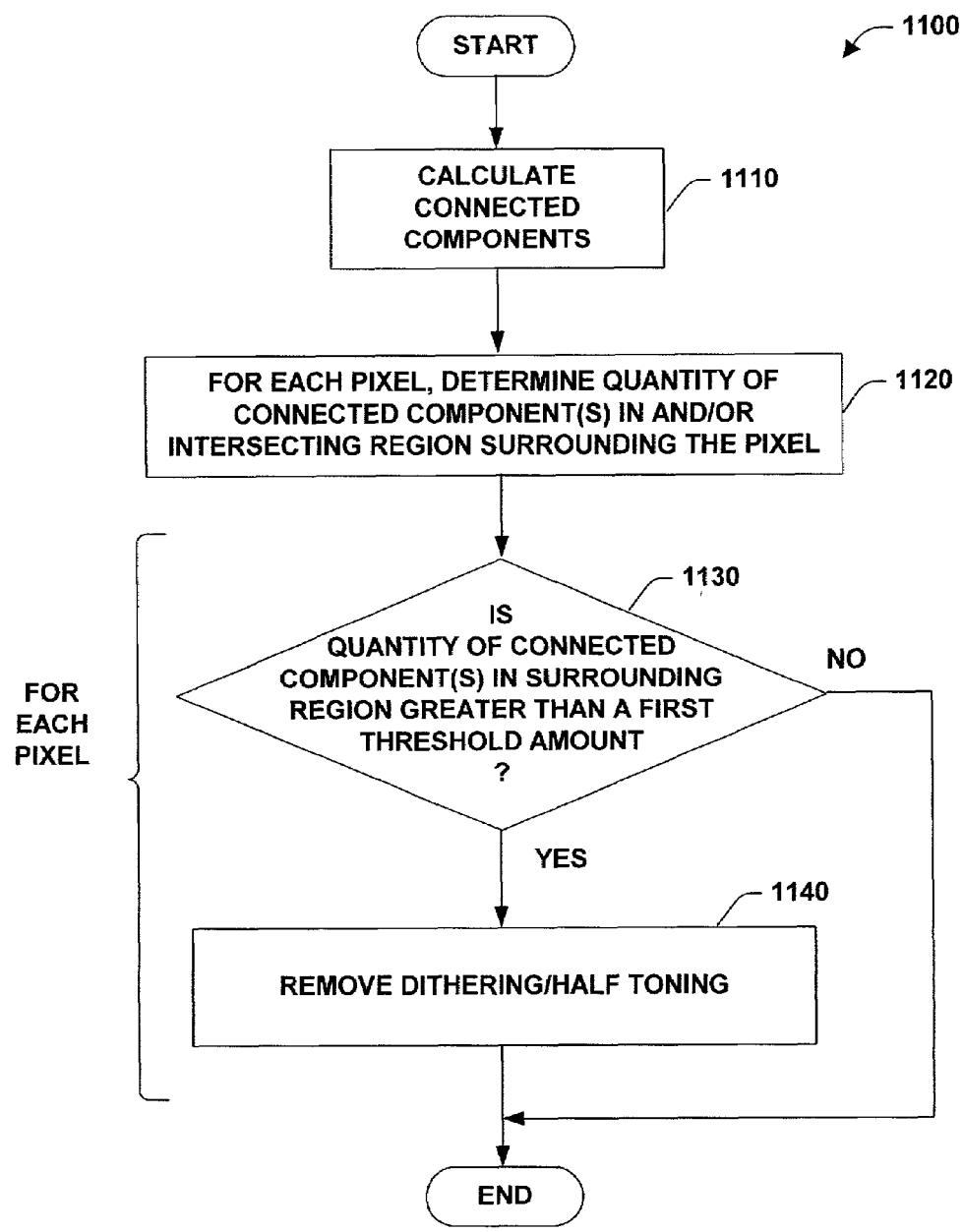
FIG. 11 is a flow chart illustrating a methodology for detecting dithering/half toning in accordance with an aspect of the present invention.
Figure 12:
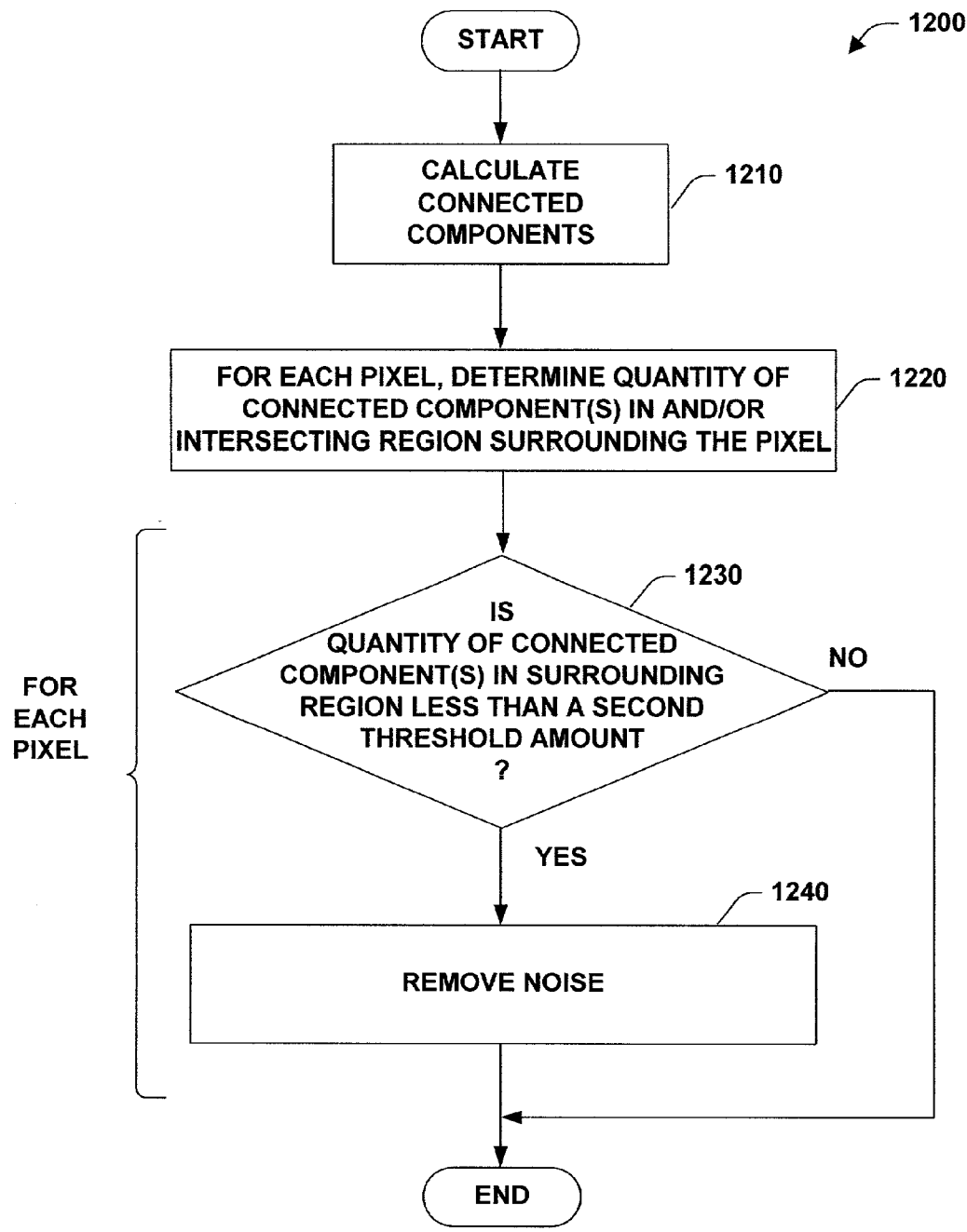
FIG. 12 is a flow chart illustrating a methodology for detecting noise in accordance with an aspect of the present invention.

In view of the exemplary systems shown and described above, methodologies that may be implemented in accordance with the present invention will be better appreciated with reference to the flow charts of FIGS. 10, 11 and 12. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 10, a methodology 1000 for detecting activity in accordance with an aspect of the present invention is illustrated. At 1010, bounding box(es) of connected component(s) are identified. At 1020, the bounding box(es) are enlarged. At 1030, a derivative image based, at least in part, upon the enlarged bounding box(es) is created. At 1040, an output based, at least in part, upon a double integral of the derivative image is provided.

Turning to FIG. 11, a methodology 1100 for detecting dithering/half toning in accordance with an aspect of the present invention is illustrated. At 1110, connected components within the bi-level image are calculated. Next, at 1120, for each pixel, the quantity of connected component(s) in and/or intersecting a region generally surrounding the pixel is determined. At 1130, for each pixel, a determination is made as to whether the quantity of connected component(s) in and/or intersecting the surrounding region is greater than a first threshold amount.

If the determination at 1130 is NO, no further action is taken with regard to the particular pixel. If the determination at 1130 is YES, at 1140, dithering/half toning is removed. For example, the pixel can be assigned to either the foreground or background of the document (e.g., to provide improved data compression). Further, a quantity of pixels in the background of the region and a quantity of pixels in the foreground of the region can be determined. Thereafter, the pixel can be assigned the foreground if the quantity of pixels in the foreground of the region is greater than the quantity of pixels in the background of the region, otherwise the pixel can be assigned to the background.

Next, referring to FIG. 12, a methodology 1200 for detecting noise in accordance with an aspect of the present invention is illustrated. At 1210, connected components within the bi-level image are calculated. Next, at 1220, for each pixel, the quantity of connected component(s) in and/or intersecting a region generally surrounding the pixel is determined. At 1230, for each pixel, a determination is made as to whether the quantity of connected component(s) in and/or intersecting the surrounding region is less than a second threshold amount.

If the determination at 1230 is NO, no further action is taken with regard to the particular pixel. If the determination at 1230 is YES, at 1240, noise is removed. For example, the pixel can be assigned to either the foreground or background of the document (e.g., to provide improved data compression).

Figure 13:
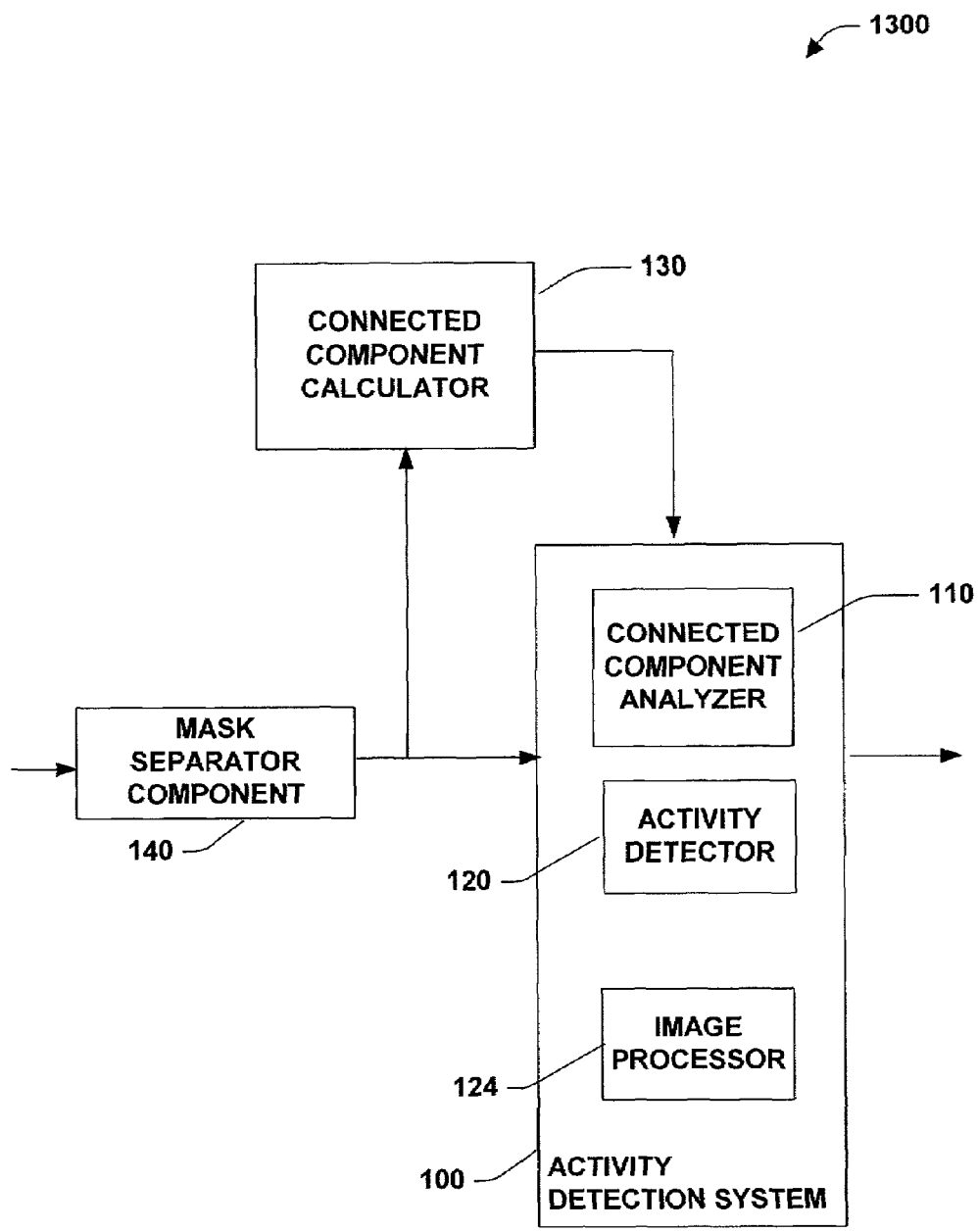
FIG. 13 is a block diagram of a segmented layered image system in accordance with an aspect of the present invention.

Next, referring to FIG. 13, a segmented layered image system 1300 in accordance with an aspect of the present invention is illustrated. The segmented layered image system 1300 includes an activity detection system 100 having a connected component analyzer 110, an activity detector 120 and an image processor 124. The segmented layered image system 1300 further includes a connected component calculator 130 and a mask separator component 140.

The mask separator component 140 receives a document image (e.g., based on a document to be archived and/or transmitted). For example, the segmented layered image system 1300 can be part of a document compression system (not shown). The document image can be a binary, RGB and/or YUV representation of document(s). The mask separator component 140 processes the document image and outputs a mask (e.g., binary) indicating whether each pixel of the document image belongs in the foreground and/or background. The mask can then be processed by the connected component calculator 130. It is to be appreciated that the mask separator component 140 can be a computer component as that term is defined herein.

The connected component calculator 130 can identify connected component(s) within the mask, using, for example, 4-connectivity or 8-connectivity method(s). Information associated with the connected component(s) within the mask is then provided to the connected component analyzer 110. It is to be appreciated that the connected component calculator 130 can be a computer component as that term is defined herein.

The activity detection system 100 receives the mask as an input. The activity detection system 100 analyzes the mask for dithering/half toning and/or noise. The activity detection system 100 provides a bi-level output based on the mask input; however, with reduced dithering/half toning and/or noise. The bi-level output can then be utilized by other components (not shown) of the segmented layered image system, for example, to achieve effective compression of the mask, the foreground and/or the background.

Figure 14:
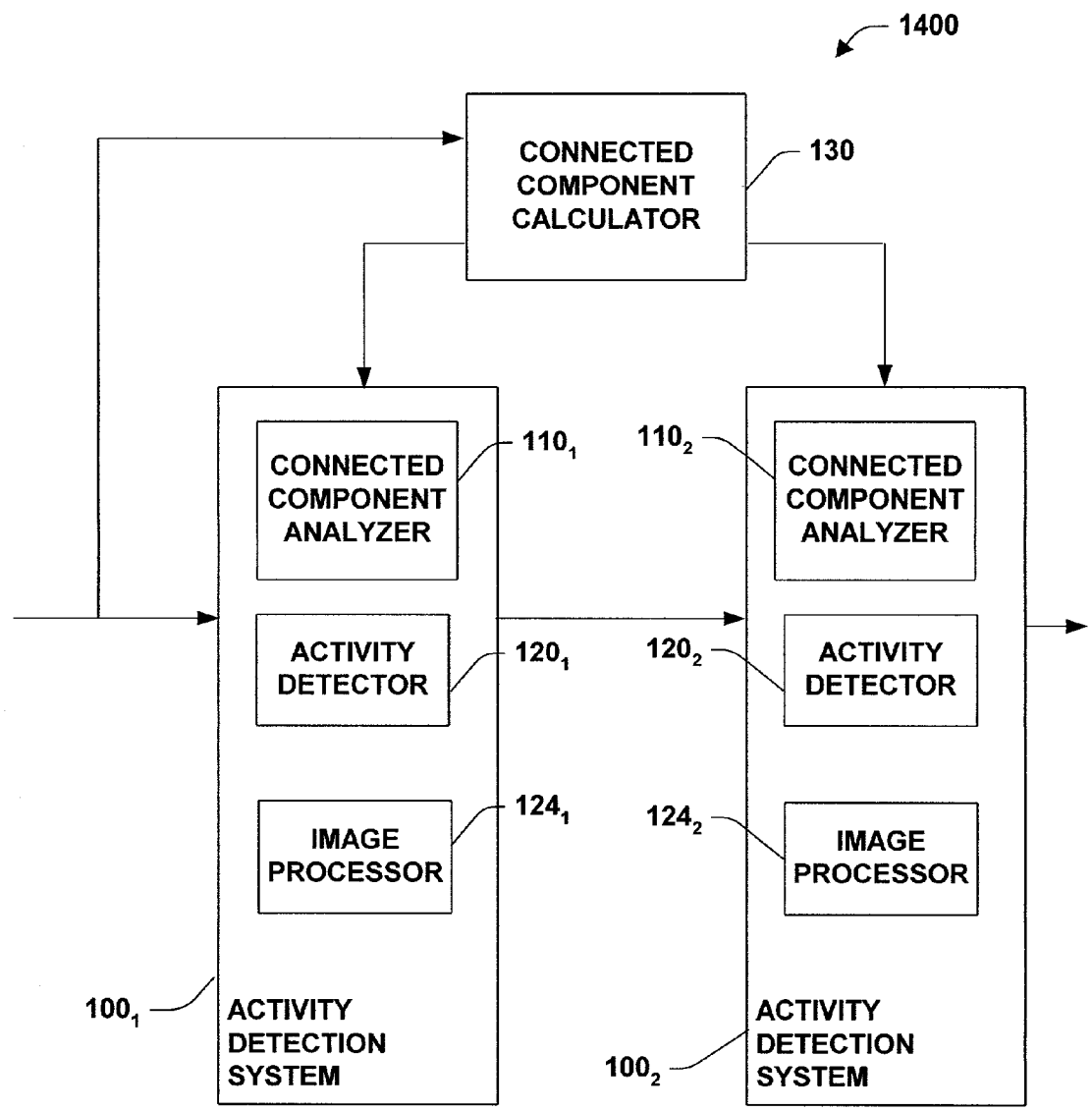
FIG. 14 is a block diagram of a system for detecting dithering/half toning and noise in accordance with an aspect of the present invention.

Turning to FIG. 14, a system 1400 for detecting dithering/half toning and noise in accordance with an aspect of the present invention is illustrated. The system 1400 includes a first activity detection system $100_1$, a second activity detection system $100_2$ and a connected component calculator 130.

The system 1400 receives a bi-level image input that is provided to the first activity detection system $100_1$ and the connected component calculator 130. The connected component calculator 130 identifies connected component(s) within the mask, using, for example, 4-connectivity or 8-connectivity method(s). Information associated with the connected component(s) within the mask is then provided to the first activity detection system $100_1$ and the second activity detection system $100_2$.

The first activity detection system $100_1$ analyzes the bi-level image for dithering/half toning as described above. For example, the activity detector $110_1$ can determine whether the quantity of connected component(s) for a pixel exceeds a first threshold. In the event that the first threshold is exceeded, the pixel is assigned to the foreground or background, for example, based upon a determination of a quantity of pixels in the background of the region and a quantity of pixels in the foreground of the region. The image processor $124_1$ then assigns the particular pixel to the foreground if the quantity of pixels in the foreground of the region is greater than the quantity of pixels in the background of the region, the image processor $124_1$ otherwise assigning the particular pixel to the background.

The output of the first activity detection system $100_1$ is then provided to the second activity detection system $100_2$ which analyzes the bi-level input for noise as described above. For example, the image processor $124_2$ can assign a particular pixel to the background or the foreground based at least in part upon the quantity of connected component(s) in and/or intersecting the region surrounding the pixel. However, in determining whether noise is present, the quantity of connected component(s) in and/or intersecting a particular region generally surrounding a particular pixel can be compared to a second threshold (e.g., two). If the quantity of connected component(s) in and/or intersecting the particular region is less than the second threshold, noise is likely present and the pixel can be assigned to either the foreground or background of the document to provide, for example, improved data compression.

While the system 1400 has been described with the first activity detection system $100_1$ performing dithering/half toning detection and the second activity detection system $100_2$ performing noise detection, it is to be appreciated that in accordance with the present invention, noise detection can be performed first with the output of the activity detection system performing noise detection being provided to the activity detection system performing dithering/half toning detection.

It is to be appreciated that the system and/or method of the present invention can be utilized in an overall segmented layered image system facilitating identification and/or compression of text, handwriting, drawings and the like. Further, those skilled in the art will recognize that the system and/or method of the present invention can be employed in a vast array of document image applications, including, but not limited to, photocopiers, document scanners, optical character recognition systems, PDAs, fax machines, digital cameras, tablet personal computers and/or digital video cameras.

Figure 15:
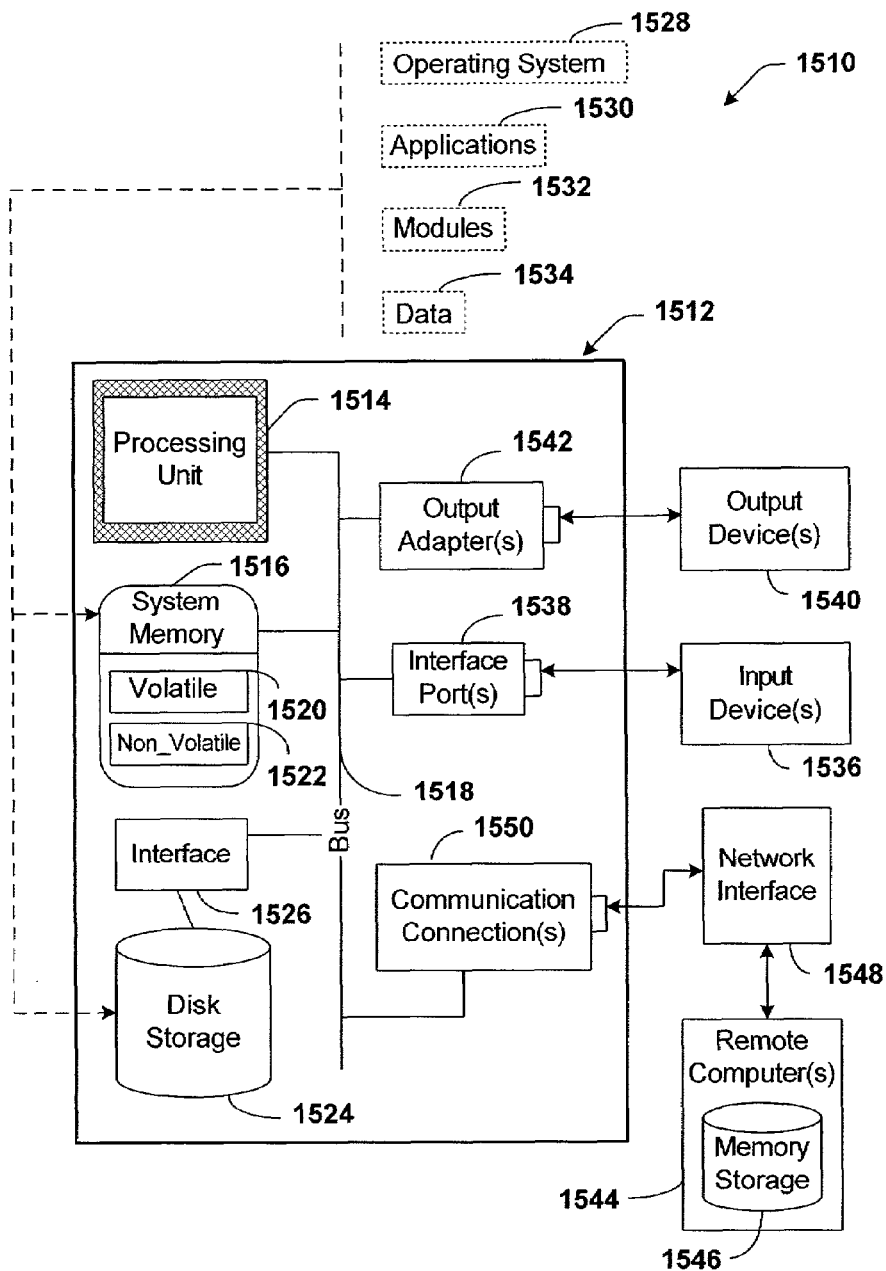
FIG. 15 illustrates an example operating environment in which the present invention may function.
Figure 16:
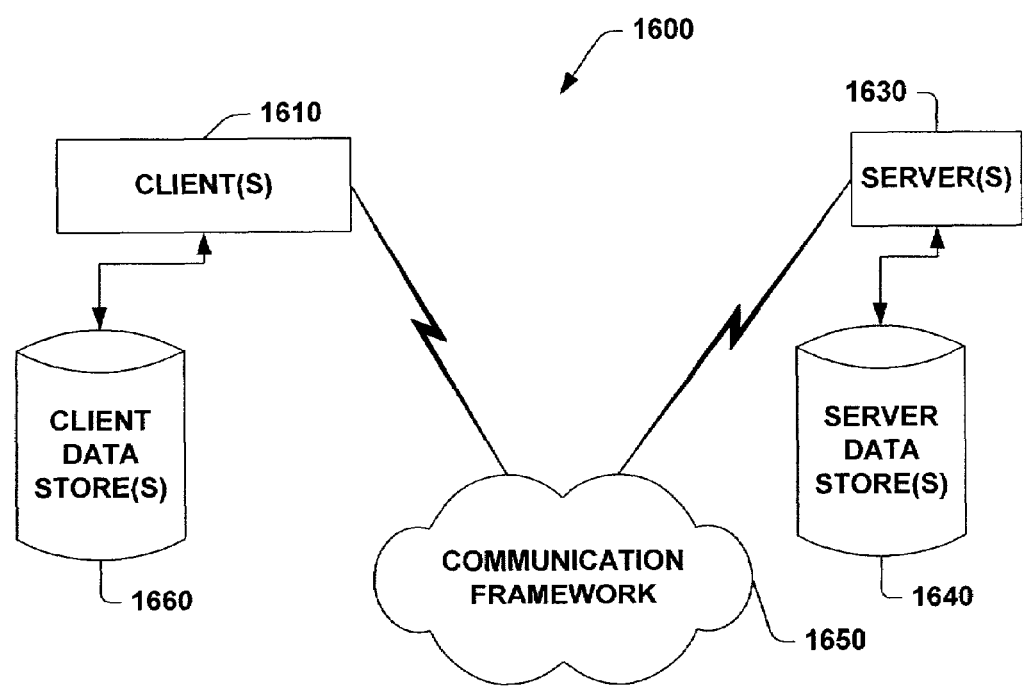
FIG. 16 is a schematic block diagram of an exemplary communication environment in accordance with the present invention.

In order to provide additional context for various aspects of the present invention, FIG. 15 and the following discussion are intended to provide a brief, general description of a suitable operating environment 1510 in which various aspects of the present invention may be implemented. FIG. 16 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 15-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jazz drive, Zip drive, LS-100 drive, flash memory card, or memory stick. In addition, disk storage 1524 can include storage media separately or in combination with other storage media including but not limited to an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. The operating system 1528, which can be stored on disk storage 1524, acts to control and allocate resources of the computer system 1512. System applications 1530 take advantage of the management of resources by the operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer 1544. The remote computer 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer 1544. Remote computer 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1502.3, Token Ring/IEEE 1502.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1600 with which the present invention can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the present invention, for example. One possible communication between a client 1610 and a server 1630 may be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An activity detection system, comprising:
   a connected component analyzer that determines a quantity of connected components in or intersecting a region surrounding a pixel by maintaining an identity of substantially all the quantity of connected components and a relative quantity of each connected component ion the region surrounding the pixel;
   an activity detector that provides an activity map output based, at least in part, upon the quantity of connected components in or intersecting the region;
   wherein said activity detector identifies bounding boxes of the connected components, said bounding boxes are enlarged and creates a derivate image of the enlarged bounding boxes; and
   an image processor that assigns the pixel to one of a background or a foreground based at least in part upon the quantity of connected components in or intersecting the region surrounding the pixel;
   wherein the image processor assigns to the foreground based at least in part upon a determination that the quantity of connected components exceeds a first threshold, and assigns the pixel to the background based at least in part upon a determination that the quantity of connected components is less than a second threshold.

2. The activity detection system of claim 1, the image processor determines a quantity of pixels in the background of the region and a quantity of pixels in the foreground of the region, the activity detector assigns the pixel to the foreground if the quantity of pixels in the foreground of the region is greater than the quantity of pixels in the background of the region, the activity detector otherwise assigns the pixel to the background.

3. The activity detection system of claim 1, the image processor assigns the pixel to the background if the quantity of connected components is less than a third threshold.

4. The activity detection system of claim 1, the connected component analyzer and the image processor receives a bi-level image input comprising a plurality of pixels assigned to at least one of the foreground and the background, the image processor provides a bi-level image output, the bi-level image output being based at least in part upon the bi-level image input and assignment of at least one pixel to one of the background or the foreground based at least in part upon the activity map output.

5. The activity detection system of claim 1, the activity detector further identifies bounding boxes of the connected components.

6. The activity detection system of claim 5, the activity detector further enlarges the bounding boxes.

7. The activity detection system of claim 6, the activity detector further creates a derivate image of the enlarged bounding boxes.

8. The activity detection system of claim 7, the activity detector provides an output associated with a double integral of the derivate image.

9. The activity detection system of claim 6, the activity detector further creates a derivate image of a lower resolution of the enlarged bounding boxes.

10. The activity detection system of claim 9, the activity detector provides an output associated with a double integral of the derivate image.

11. The activity detection system of claim 1, the activity detector further dilates the activity map output.

12. The activity detection system of claim 1, the activity detector further erodes the activity map output.

13. The activity detection system of claim 1, the activity detector further smoothes the activity map output.

14. A photocopier employing the activity detection system of claim 1.

15. A document scanner employing the activity detection system of claim 1.

16. An optical character recognition system employing the activity detection system of claim 1.

17. A personal digital assistant employing the activity detection system of claim 1.

18. A fax machine employing the activity detection system of claim 1.

19. A digital camera employing the activity detection system of claim 1.

20. A digital video camera employing the activity detection system of claim 1.

21. A segmented layered image system employing the activity detection system of claim 1.

22. A tablet personal computer employing the activity detection system of claim 1.

23. A method for detecting activity in an image, comprising:
identifying bounding boxes of connected components;
enlarging the bounding boxes;
creating a derivative image based, at least in part upon the enlarged bounding boxes, the creation of the derivative image includes maintaining an identity of substantially all connected components circumscribed by the enlarged bounding boxes and a relative quantity associated with each connected component in a region surrounding a pixel;
providing an output based, at least in part, upon a double integral of the derivate image; and
assigning pixels to a foreground if a number of connected components associated therewith exceeds a first threshold level and to a background if the number of connected components in and intersecting the region surrounding the pixel is less than or equal to a second threshold level.

24. A method for detecting activity in an image, comprising:
calculating a quantity of connected components in or intersecting a region surrounding a pixel, the calculation includes at least maintaining an identity of connected components and a relative quantity associated with each connected component in the region, the relative quantity determined with respect to the pixel;
wherein identifying bounding boxes of the connected components, wherein said bounding boxes are enlarged and creating a derivate image of the enlarged bounding boxes; and
assigning the pixel to one of a background or a foreground based at least in part upon the quantity of connected components in or intersecting the region surrounding the pixel;
wherein the pixel is assigned to the foreground if the quantity of connected components in or intersecting the region surrounding the pixel is greater than a first threshold and to the background if the quantity of connected components in or intersecting the region surrounding the pixel is less than or equal to a second threshold.

25. The method of claim 24, further comprising identifying connected components in or intersecting the region surrounding the pixel.

26. The method of claim 24, further comprising at least one of the following:
determining whether the quantity of connected components in or intersecting the region exceeds a first threshold;
determining a quantity of pixels in the background of the region and a quantity of pixels in the foreground of the region; and,
assigning the pixel to the foreground if the quantity of pixels in the foreground of the region is greater than the quantity of pixels in the background of the region.

27. The method of claim 24, further comprising assigning the pixel to the background if the quantity of connected components is less than a third threshold.

28. A method for detecting dithering in an image, comprising:
calculating a quantity of connected components in or intersecting a region surrounding a pixel by establishing a relative quantity associated with each connected component in the region from the perspective of the pixel and maintaining an identity of all connected components in the quantity of connected components;
wherein identifying bounding boxes of the connected components, wherein said bounding boxes are enlarged and creating a derivate image of the enlarged bounding boxes;
determining whether the quantity of connected component in or intersecting the region exceeds a first threshold; and assigning the pixel to a foreground, if the quantity of connected component in or intersecting the region surrounding the pixel is greater than a first threshold, and to a background if the quantity of connected components is less than or equal to a second threshold.

29. The method of claim 28, further comprising at least one of the following:
determining a quantity of pixels in the background of the region and a quantity of pixels in the foreground of the region; and,
assigning the pixel to the foreground if the quantity of pixels in the foreground of the region is greater than the quantity of pixels in the background of the region.

30. A method for detecting noise in an image, comprising:
calculating a quantity of connected components surrounding a pixel in a region, wherein identifying bounding boxes of the connected components, wherein said bounding boxes are enlarged and creating a derivate image of the enlarged bounding boxes; and
assigning the pixel to one of the background or the foreground based at least in part upon a determination that the quantity of connected components is less than a second threshold or greater than a first threshold, the quantity of connected components established via maintenance of substantially all connected components and utilization of a relative quantity of each connected component in the region, the relative quantity establish with respect to the pixel.

31. A computer readable medium storing computer executable components of a system for activity detection, comprising:
a connected component analyzer component that determines a quantity of connected components in or intersecting a region surrounding a pixel by maintaining an identity of substantially all connected components and a relative quantity associated with each connected component include in the quantity of connected components, the relative quantity ascertained with respect to the pixel, wherein identifying bounding boxes of the connected components, wherein said bounding boxes are enlarged and creating a derivate image of the enlarged bounding boxes; and
an activity detector component that provides an activity output based, at least in part, upon the quantity of connected components in or intersecting the region, wherein the pixel is assigned to a foreground of the image if the quantity of connected components in or intersecting a region around the pixel is greater than a first threshold and to a background if the quantity of connected components in or intersecting a region around the pixel is less than or equal to a second threshold.

32. A computer readable medium storing computer executable instructions operable to perform a method for activity detection, comprising:
identifying bounding boxes of connected components;
enlarging the bounding boxes;
creating a derivative image based, at least in part upon the enlarged bounding boxes, the derivative image created at least by maintaining an identity of all connected components included in the enlarged bounding boxes and establishing a relative quantity associated with each connected component in a region surrounding a pixel;
providing an output based, at least in part, upon a double integral of the derivate image; and
analyzing the output image to assign a pixel therein to one of a foreground and a background based at least in part on whether a number of connected components in and/or intersecting a region about the pixel is grater than a first threshold or less than or equal to a second threshold, respectively.

33. A computer readable medium storing computer executable instructions operable to perform a method for activity detection, comprising:
calculating a quantity of connected components in or intersecting a region surrounding a pixel by maintaining an identity of at least all the quantity of connected components and establishing a relative quantity associated with each connected component included in the quantity of connected components in the region surrounding the pixel, wherein identifying bounding boxes of the connected components, wherein said bounding boxes are enlarged and creating a derivate image of the enlarged bounding boxes; and
assigning the pixel to one of a background or a foreground based at least in part upon the quantity of connected components in or intersecting the region surrounding the pixel, wherein the pixel is assigned to the foreground if the quantity of connected components exceeds a first threshold and to the background if the quantity is less than a second threshold.

34. An activity detector, comprising:
means for determining a quantity of connected components in or intersecting a region surrounding a pixel;
means for maintaining an identity of at least all the quantity of connected components and establishing a relative quantity associated with each connected component that comprises the identity in the region, the relative quantity determined from the perspective of the pixel, wherein identifying bounding boxes of the connected components, wherein said bounding boxes are enlarged and creating a derivate image of the enlarged bounding boxes; and,
means for assigning the pixel to one of a background or a foreground based at least in part upon the quantity of connected components in or intersecting the region surrounding the pixel, wherein the means for assigning assigns the pixel to a foreground if the quantity is equal to or greater than a first threshold and assigns the pixel to the background if the quantity is less than or equal to a second threshold.

* * * * *